(12) United States Patent
Hong (10) Patent No.: US 7,996,126 B2
(45) Date of Patent: Aug. 9, 2011

(54) APPARATUS AND METHOD FOR NAVIGATION BASED ON ILLUMINATION INTENSITY

(75) Inventor: Young-jin Hong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1360 days.

(21) Appl. No.: 11/237,711

(22) Filed: Sep. 29, 2005

(65) Prior Publication Data

US 2006/0074532 A1 Apr. 6, 2006

(30) Foreign Application Priority Data

Oct. 5, 2004 (KR) ........................ 10-2004-0079105

(51) Int. Cl.
*G01C 22/00* (2006.01)
(52) U.S. Cl. ............ 701/28; 701/201; 701/301; 701/302
(58) Field of Classification Search .................... 701/28, 701/201, 301, 302; 901/1, 46; 318/568.17; 700/250; 15/319
See application file for complete search history.

(56) References Cited

U.S. PATENT DOCUMENTS

| | | | | | |
|---|---|---|---|---|---|
| 4,627,511 A | * | 12/1986 | Yajima | ........................ | 180/167 |
| 4,815,008 A | * | 3/1989 | Kadonoff et al. | ............... | 701/23 |
| 5,051,906 A | * | 9/1991 | Evans et al. | ..................... | 701/28 |
| 5,361,023 A | * | 11/1994 | Kim | ........................ | 318/568.16 |
| 5,569,371 A | * | 10/1996 | Perling | ........................... | 210/85 |
| 6,124,694 A | * | 9/2000 | Bancroft et al. | .............. | 318/587 |
| 7,565,034 B2 | * | 7/2009 | Siah et al. | ..................... | 382/305 |
| 2002/0049522 A1 | * | 4/2002 | Ruffner | .......................... | 701/23 |
| 2003/0030399 A1 | * | 2/2003 | Jacobs | ...................... | 318/568.16 |
| 2003/0173572 A1 | * | 9/2003 | Rhodes et al. | .................. | 257/88 |
| 2004/0016077 A1 | * | 1/2004 | Song et al. | ...................... | 15/319 |
| 2004/0079973 A1 | * | 4/2004 | Barna et al. | .................... | 257/222 |
| 2004/0080648 A1 | * | 4/2004 | Rhodes | .......................... | 348/308 |
| 2004/0083570 A1 | * | 5/2004 | Song et al. | ...................... | 15/319 |
| 2004/0181896 A1 | * | 9/2004 | Egawa et al. | ................... | 15/319 |
| 2005/0216122 A1 | * | 9/2005 | Tani | .............................. | 700/245 |
| 2005/0251312 A1 | * | 11/2005 | Tani | ................................ | 701/41 |
| 2005/0273967 A1 | * | 12/2005 | Taylor et al. | .................... | 15/319 |
| 2006/0020369 A1 | * | 1/2006 | Taylor et al. | ................... | 700/245 |

* cited by examiner

*Primary Examiner* — Khoi Tran
*Assistant Examiner* — Jorge Peche
(74) *Attorney, Agent, or Firm* — Staas & Halsey LLP (57) ABSTRACT

An apparatus and method for navigation based on the intensity of illumination. The apparatus includes: a photosensitive sensor sensing light; a photosensitive sensor processor calculating an illumination intensity of the light sensed by the photosensitive sensor; a drive unit moving the apparatus; an actuator actuating the drive unit; and a task manager generating data usable to move the apparatus along a trajectory of a preset target illumination intensity where the illumination intensity measured by the photosensitive sensor processor is the same as the target illumination intensity using the difference between the measured illumination intensity and the target illumination intensity. The actuator uses the data generated by the task manager to actuate the drive unit.

31 Claims, 8 Drawing Sheets

| | -140 | -120 | -100 | -80 | -60 | -40 | -20 | 0 | 20 | 40 | 60 | 80 | 100 | 120 | 140 |
|---|---|---|---|---|---|---|---|---|---|---|---|---|---|---|---|
| 240 | 51.5 | 54.8 | 56.3 | 57.5 | 58.4 | 59.4 | 59.9 | 59.8 | 59.7 | 59 | 58 | 57.2 | 55.5 | 53.1 | 51.1 |
| 220 | 58.4 | 62.1 | 64.9 | 57.1 | 67.9 | 69.5 | 69.7 | 69.9 | 70.3 | 69.1 | 67.9 | 66.3 | 63.7 | 61.1 | 57.5 |
| 200 | 66.2 | 69.8 | 73.7 | 76.1 | 79.1 | 80.3 | 80.4 | 81.4 | 80.9 | 78.6 | 77.9 | 75.2 | 72.5 | 69.5 | 65.2 |
| 180 | 73.8 | 79.2 | 83.8 | 86.5 | 89.4 | 91.5 | 92.1 | 92 | 90.7 | 88.9 | 86.1 | 83 | 78.6 | 73.4 |  |
| 160 | 82 | 88.9 | 94.5 | 99.5 | 102.4 | 103.2 | 106.7 | 107.2 | 106 | 104.3 | 102.7 | 99.7 | 94.6 | 88.9 | 83.7 |
| 140 | 91.8 | 99.7 | 105.6 | 111.6 | 116 | 117.4 | 120.3 | 120.3 | 120.5 | 118.1 | 115.7 | 112.5 | 106 | 99.4 | 92.6 |
| 120 | 100.6 | 108.5 | 116.8 | 123.7 | 128.7 | 133.9 | 136.5 | 136.8 | 136.6 | 134.2 | 130 | 125 | 117.1 | 109.7 | 102.4 |
| 100 | 108.3 | 119.2 | 128.9 | 136.6 | 143.2 | 147.9 | 150.5 | 152.1 | 151.7 | 148.1 | 143.9 | 137.5 | 129.7 | 121.3 | 112.6 |
| 80 | 116.5 | 127.2 | 138.6 | 147.8 | 155 | 161.1 | 165.1 | 166 | 165.1 | 162 | 157.1 | 150.2 | 140.6 | 130.7 | 119.6 |
| 60 | 125.5 | 133.9 | 145.9 | 157 | 166.7 | 173 | 177.1 | 178.4 | 177.8 | 173.2 | 167.8 | 159.9 | 149.9 | 138.3 | 126.5 |
| 40 | 129.6 | 141.9 | 154.8 | 165.6 | 175.7 | 183.1 | 187.1 | 188 | 188 | 182.7 | 176.4 | 167.9 | 157.1 | 144.5 | 131.1 |
| 20 | 132.5 | 145.8 | 158.8 | 170.4 | 181.5 | 188.1 | 193.6 | 194.7 | 193.2 | 188.5 | 181.7 | 172.2 | 160 | 147.9 | 134.7 |
| 0 | 133.6 | 147 | 160.5 | 172.6 | 183 | 191.4 | 195.4 | 195.8 | 194.6 | 190.1 | 183.5 | 173.9 | 163.1 | 149.4 | 135.6 |
| -20 | 132.2 | 145 | 158.5 | 170.1 | 182.4 | 189.4 | 193.3 | 195.1 | 192.3 | 188.7 | 182.1 | 172.1 | 161.3 | 148.5 | 134 |
| -40 | 129.3 | 141.9 | 154.5 | 165.4 | 175.7 | 182.3 | 187.2 | 188.1 | 186.6 | 183.1 | 176.7 | 167.1 | 156.6 | 144 | 131.3 |
| -60 | 124.1 | 135.7 | 147.7 | 157.3 | 165.3 | 172 | 176.2 | 177 | 176.2 | 173.2 | 167.2 | 159.5 | 148.9 | 136.2 | 124.3 |
| -80 | 116.9 | 127.6 | 138.5 | 148.3 | 155.5 | 160 | 163.5 | 163.8 | 163.6 | 160.9 | 155.9 | 148.6 | 139.2 | 128.5 | 117.5 |
| -100 | 109.7 | 118.5 | 128.5 | 136 | 142.2 | 147 | 150 | 150.2 | 149.8 | 147.5 | 143.5 | 136.5 | 128.6 | 119 | 110.1 |
| -120 | 103.5 | 111.3 | 118.8 | 124.4 | 129.5 | 133.3 | 135.9 | 136.3 | 134.5 | 133 | 129.7 | 124.5 | 116.4 | 109 | 100.2 |
| -140 | 93.5 | 99.7 | 106.3 | 111.9 | 115.3 | 117.7 | 120 | 121.4 | 120.5 | 118.3 | 115 | 110.2 | 104.2 | 98.6 | 90.7 |
| -160 | 84.9 | 90.2 | 96 | 100.1 | 102.7 | 104.9 | 106.9 | 106.5 | 105.5 | 104.1 | 102.2 | 98.4 | 93.4 | 88.3 | 82.3 |
| -180 | 76.9 | 81.5 | 85.7 | 88.4 | 90.8 | 93 | 94.1 | 93.6 | 93.3 | 91.4 | 98.4 | 87 | 82.9 | 78.7 | 73.4 |
| -200 | 68.1 | 72.2 | 75.1 | 77.4 | 78.6 | 80.2 | 81.2 | 81.2 | 81.1 | 79.3 | 78.1 | 76 | 72.9 | 69.5 | 64.7 |
| -220 | 61.1 | 63.8 | 66.2 | 68 | 69.1 | 70.3 | 70.9 | 70.5 | 70.4 | 69.2 | 68.2 | 66.4 | 64.47 | 61.6 | 58 |
| -240 | 54.2 | 57.2 | 58.8 | 59.7 | 60.3 | 61.9 | 66.7 | 61.5 | 60.9 | 60.1 | 59 | 58 | 55.9 | 53.6 | 51.1 |

APPARATUS AND METHOD FOR NAVIGATION BASED ON ILLUMINATION INTENSITY

CROSS-REFERENCE TO RELATED APPLICATION

This application claims priority from Korean Patent Application No. 10-2004-0079105 filed on Oct. 5, 2004 in the Korean Intellectual Property Office, the disclosure of which is incorporated herein by reference in its entirety.

BACKGROUND OF THE INVENTION

1. Field of the Invention

The present invention relates to an apparatus and method for navigation based on the intensity of illumination, and more particularly, to an apparatus and method for navigation based on illumination intensity using an inexpensive photosensitive sensor, which enables simple signal processing and navigation of a space by moving along a path where the illumination intensity is the same.

2. Description of Related Art

In general, a navigation apparatus for navigating a space often requires an expensive sensor such as a wide-angle camera, a laser, an acceleration sensor, or a gyro sensor, and a complicated signal processing system. Navigation apparatuses are presented in various patents. For example, U.S. Pat. No. 5,051,906 proposes a method and apparatus for determining the orientation and position of a vehicle in an environment, such as a hallway, from an image of a reflective ceiling feature.

Figure 1:
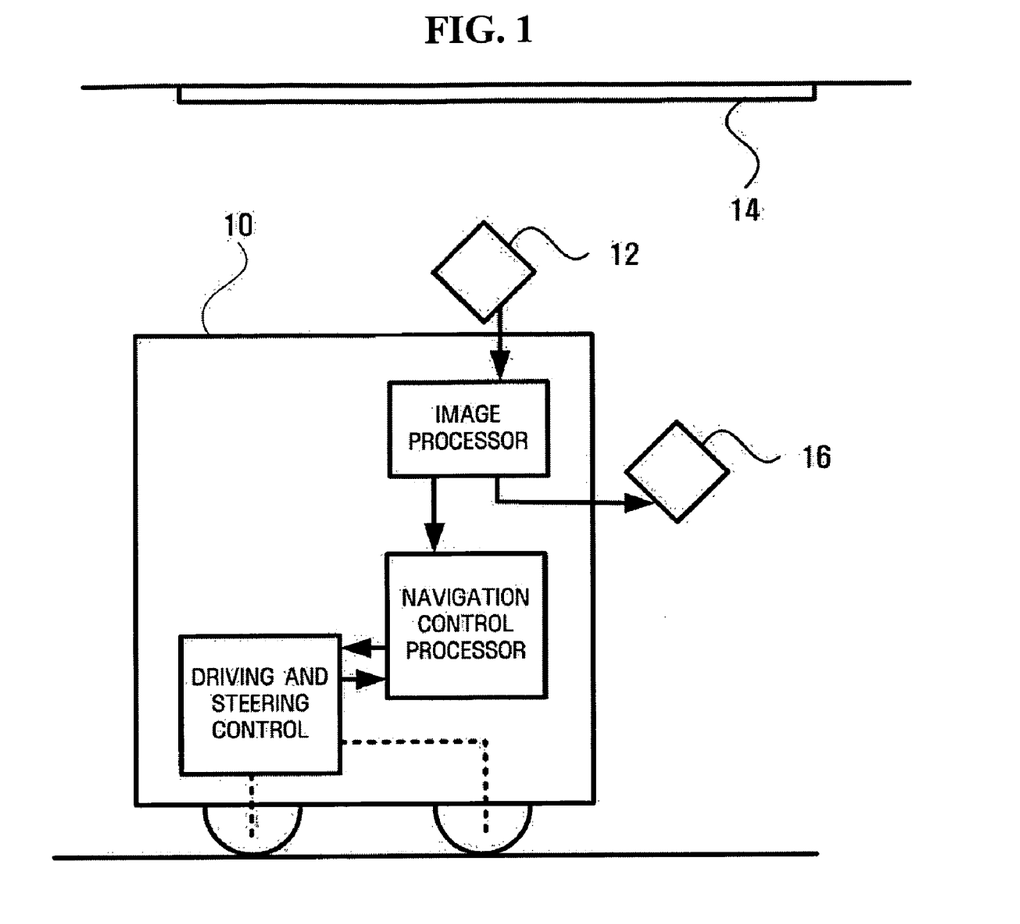
FIG. 1 shows a conventional robot navigation apparatus.

FIG. 1 shows the conventional robot navigation apparatus 10 disclosed in U.S. Pat. No. 5,051,906.

Referring to FIG. 1, the navigation apparatus includes a light source 16 and a camera 12 that is pitched up obliquely at an intermediate angle between the horizon and the zenith. The camera 12 views a ceiling having one or more reflective features 14 which are preferably aligned with an axis of the hallway. A pattern of a feature 14 of the ceiling is detected by the camera 12 in order to derive vehicle navigation information.

However, the conventional navigation apparatus requires an expensive sensor such as the camera 12 to determine a navigation path for the vehicle. Also, a signal received from the sensor is difficult to process due to a large amount of noise contained therein.

BRIEF SUMMARY

An aspect of the present invention provides a navigation apparatus and method that can reduce the manufacturing costs by using an inexpensive sensor.

An aspect of the present invention also provides a navigation apparatus and method designed to enable simple signal processing by using illumination insensitive to noise as a signal.

According to an aspect of the present invention, there is provided an apparatus for navigation based on illumination intensity, which includes an actuator and a drive unit actuated by the actuator. The navigation apparatus includes: a photosensitive sensor sensing light; a photosensitive sensor processor calculating an illumination intensity of the light sensed by the photosensitive sensor; a drive unit moving the apparatus; an actuator actuating the drive unit; and a task manager generating data usable to move the apparatus along a trajectory of a preset target illumination intensity where the illumination intensity measured by the photosensitive sensor processor is the same as the target illumination intensity using the difference between the measured illumination intensity and the target illumination intensity. The actuator uses the data generated by the task manager to actuate the drive unit.

According to another aspect of the present invention, there is provided an method for navigating a navigation apparatus including an actuator and a drive unit actuated by the actuator based on the intensity of illumination, the method including: designating an initial measured illumination intensity as a target illumination intensity; generating data usable to move the navigation apparatus along a target illumination intensity trajectory where the measured illumination intensity is the same as the target illumination intensity; and actuating the drive unit using the data to move the navigation apparatus along the target illumination intensity trajectory.

According to still another aspect of the present invention, there is provided a method for navigating a navigation apparatus including an actuator and a drive unit actuated by the actuator based on the intensity of illumination, the method including: designating an initial measured illumination intensity as a target illumination intensity; generating data usable to move the navigation apparatus along a target illumination intensity trajectory where the measured illumination intensity is the same as the target illumination intensity; actuating the drive unit using the data to move the navigation apparatus along the target illumination intensity trajectory; calculating a cumulative distance traveled on the target illumination intensity trajectory; rotating the navigation apparatus inward 90 degrees relative to a tangent of the target illumination intensity trajectory when the cumulative distance traveled is greater than a predetermined threshold; measuring the illumination intensity while moving the navigation apparatus forward after the rotation; and ceasing operation of the navigation apparatus when the measured illumination intensity is less than the previously measured illumination intensity.

According to other aspects of the present invention, there are provided computer-readable storage media encoded with processing instructions for causing a processor to execute the aforementioned methods.

Additional and/or other aspects and advantages of the present invention will be set forth in part in the description which follows and, in part, will be obvious from the description, or may be learned by practice of the invention

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

A navigation apparatus and method according to embodiments of the present invention will now be described more fully with reference to the accompanying drawings. It is to be understood that each block of the flowchart illustrations, and combinations of blocks in the flowchart illustrations, can be implemented by computer program instructions. These computer program instructions can be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational operations to be performed on the computer or other programmable apparatus to produce a computer implemented process such that the instructions that execute on the computer or other programmable apparatus provide operations for implementing the functions specified in the flowchart block or blocks. And each block of the flowchart illustrations may represent a module, segment, or portion of code, which comprises one or more executable instructions for implementing the specified logical function(s). It is to be understood that in some alternative implementations, the functions noted in the blocks may occur out of order. For example, two blocks shown in succession may in fact be executed substantially concurrently or the blocks may sometimes be executed in reverse order depending upon the functionality involved.

Figure 2A:
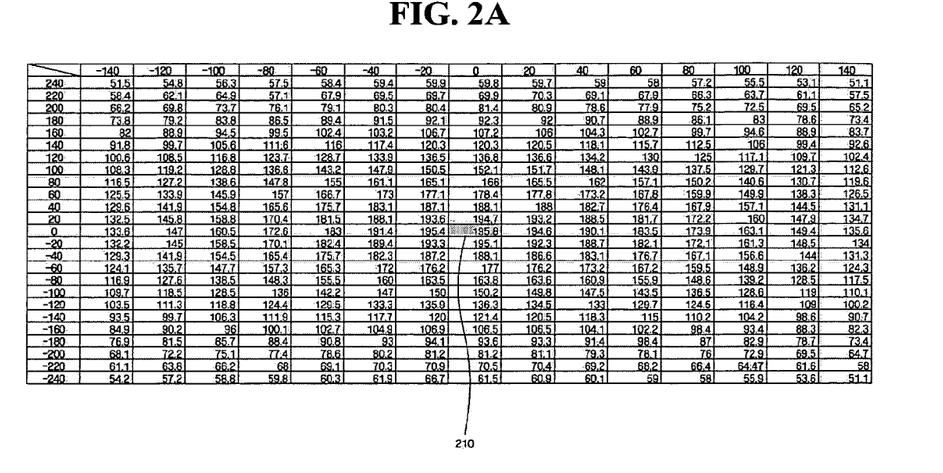
FIGS. 2A and 2B illustrate the illumination intensity distribution of a room.
Figure 2B:
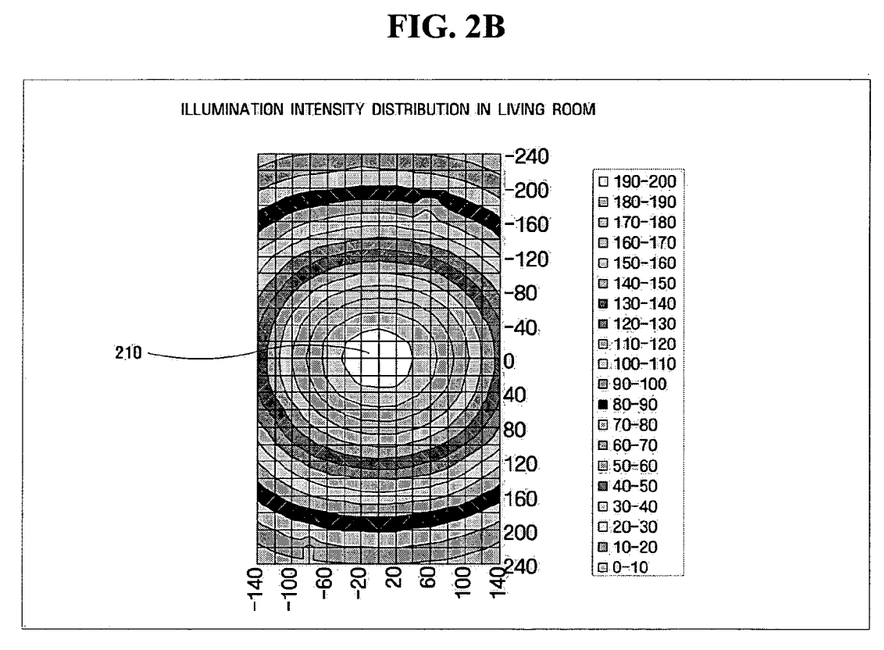

FIGS. 2A and 2B illustrate the illumination intensity distribution of a room.

As illustrated in FIG. 2B, the illumination intensity distribution of a room having a source of light at the center has a plurality of concentric circles. As is evident from the table of FIG. 2, the illumination intensity is the highest at the center 210 of the room where the illuminator is located, and it decreases away from the center 210. The illumination intensity distribution produced by a source of light at any location on a ceiling also has a plurality of concentric circles. Using these characteristics, it is possible to realize an apparatus whose movement is controlled by tracking the illumination intensity pattern of a room using only a photosensitive sensor.

While the present embodiment has been described by way of an example where the light source of a navigation apparatus produces visible light that is similar to interior illumination, it is to be understood that the light source may produce non-visible light such as infrared light.

Figure 3:
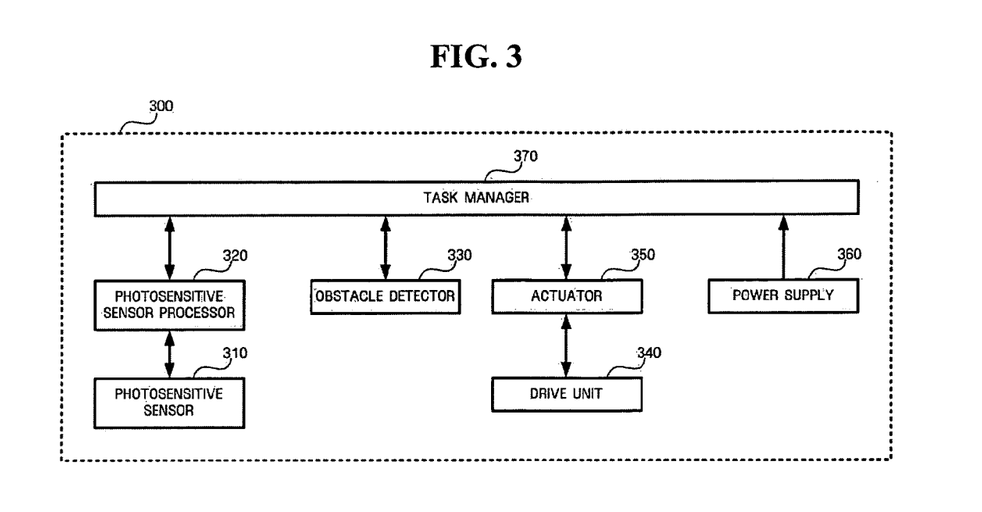
FIG. 3 is a block diagram of a navigation apparatus according to an embodiment of the present invention.

FIG. 3 is a block diagram of a navigation apparatus 300 using a light source according to an embodiment of the present invention.

Referring to FIG. 3, the navigation apparatus 300 includes a photosensitive sensor 310, a photosensitive sensor processor 320, an obstacle detector 330, a drive unit 340, an actuator 350, a power supply 360, and a task manager 370.

The photosensitive sensor 310 senses light intensity; it may be a photodiode whose resistance varies as light passes through it. Various types of photosensitive sensors may be used depending on the type of light source used. As described above, the photosensitive sensor 310 may sense interior illumination as well as non-visible light such as infrared light. The photosensitive sensor processor 320 calculates the amount of light sensed by the photosensitive sensor, and then sends the result to the task manager 370.

The obstacle detector 330 detects whether there is an obstacle in the path along which the navigation apparatus 300 moves (hereinafter called a "movement path"), and it may be realized by an obstacle detecting sensor such as a bumper. The obstacle detector 330 delivers information to the task manager 370 every time it detects an obstacle.

The task manager 370, which is the intelligence of the navigation apparatus 300, generates data and enables the navigation apparatus 300 to move in a direction that minimizes the difference between the preset target illumination intensity and the illumination intensity measured at the current position; i.e., the task manager 370 makes the navigation apparatus navigate along a target illumination intensity trajectory in which the currently measured illumination intensity is the same as the target illumination intensity. The data generated for following the target illumination intensity trajectory may contain the linear velocity of the drive unit 340 and the rotary angle of the drive unit 340 with respect to the movement path. The task manager 370 respectively receives information about illumination intensity measured at the current position, information about the existence of an obstacle in the movement path, and information about how far the drive unit 340 has moved from the photosensitive sensor 310, the obstacle detector 330, and the actuator 350. The task manager 370 also receives information from the power supply 360 about the amount of battery remaining, and if the amount of battery remaining is less than a predetermined threshold, the task manager 370 generates data for moving the navigation apparatus to a location for automatic re-charging. The principle of operation of navigating along a target illumination intensity trajectory will be described in detail later with reference to FIG. 4.

The drive unit 340 moves the navigation apparatus 300 and may be wheels or another moving means. The actuator 350 controls the movement of the drive unit 340 and includes a motor and a motor control module. The actuator 350 may further include a driving axle, a transmission, and other components. The actuator 350 receives the data generated by the task manager 370 and controls the velocity of the drive unit 340 or changes the moving direction or size of the drive unit 340 so that the navigation apparatus 300 can follow the target illumination intensity trajectory. The actuator 350 also calculates the velocity of the drive unit 340 or the distance the drive unit 340 moves, which are then sent to the task manager 370.

The power supply 360 checks the amount of battery remaining, which supplies power to the navigation apparatus 300 and provides this information to the task manager 370. When the remaining amount of battery is less than a predetermined threshold, the task manager 370 allows the power supply 360 to switch into automatic charging mode as described above.

Figure 4:
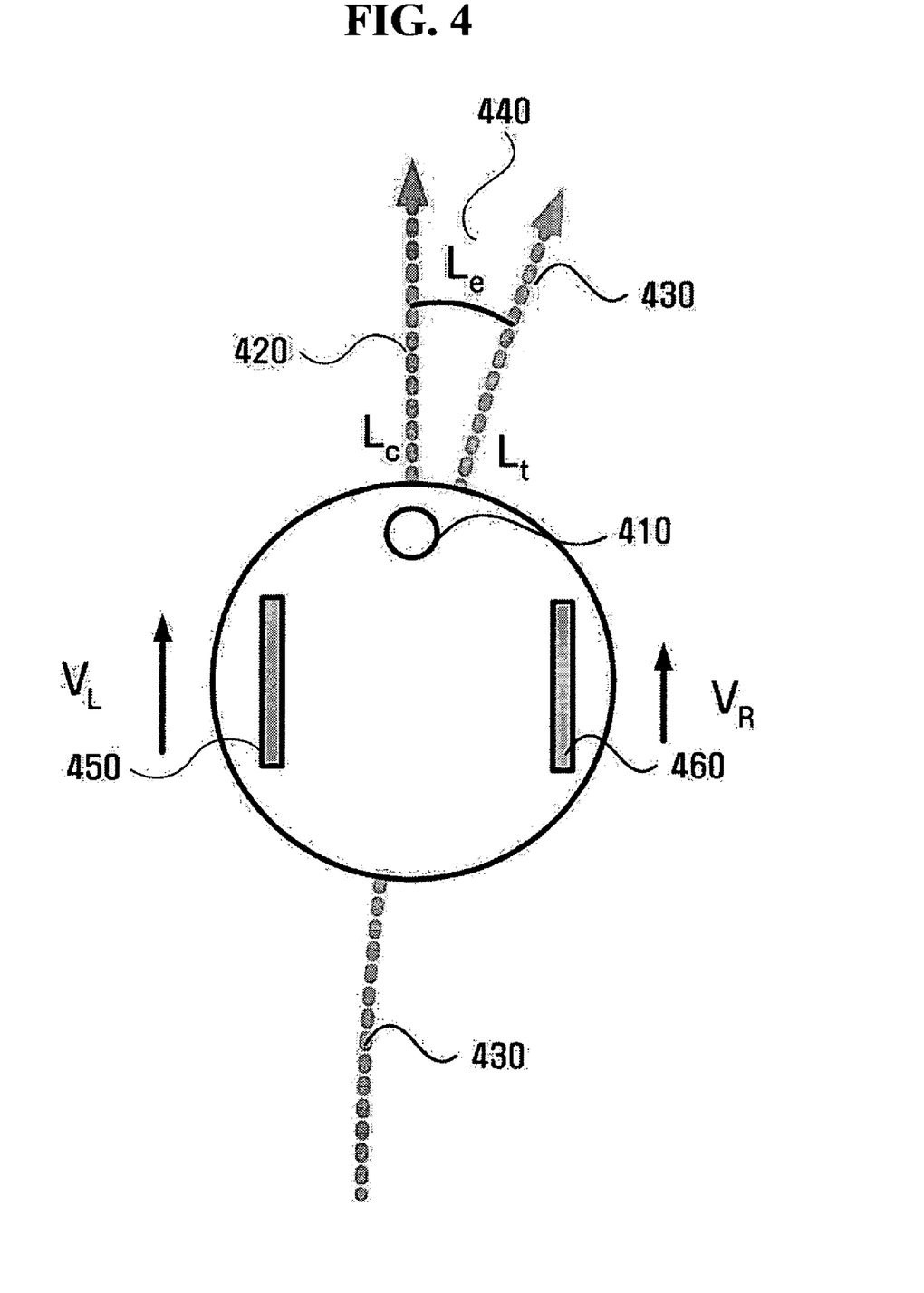
FIG. 4 shows the principle of a navigation apparatus tracking the illumination intensity according to an embodiment of the present invention.

FIG. 4 shows the principle of a navigation apparatus that tracks the intensity of illumination according to an embodiment of the present invention.

As described above with reference to FIG. 2, the intensity distribution of interior illumination has a plurality of concentric curves such as circles or ellipses centered at a position immediately below the source of light. Thus, a navigation apparatus with a photosensitive sensor can move along a concentrically curved trajectory by tracking a predetermined illumination intensity pattern. FIG. 4 shows the principle of operation of a navigation apparatus that is driven by two wheels and can move along a target illumination intensity trajectory in which the currently measured illumination intensity is the same as preset target illumination intensity according to an embodiment of the present invention.

A navigation apparatus according to an embodiment of the present invention may use a proportional integral differential (PID) control algorithm, which is a common methodology in process control to control a motor. Illumination intensity measured at a starting position using a photosensitive sensor 410 is set as the target illumination intensity $L_t$. Illumination intensity $L_c$ is measured at a current position on a movement path 420 of the navigation apparatus. Then, an illumination difference $L_e$ 440 between the currently measured illumination intensity $L_c$ and the target illumination intensity $L_t$ is calculated to control the velocities $V_L$ and $V_R$ of the respective left and right wheels 450 and 460. The difference $L_e$ and the velocities $V_L$ and $V_R$ are defined by the following equations:

$$L_e = L_t - L_c$$

$$V_L = V_O + G_P \cdot L_e + G_D(L_e - L_P)$$

$$V_R = V_O - G_P \cdot L_e + G_D(L_e - L_P)$$

where $V_O$ is a default movement velocity, $G_P$ and $G_D$ respectively denote a proportional gain and a differential gain needed to control the motor in the navigation apparatus, and $L_p$ is illumination intensity measured by the photosensitive sensor 410 during the previous trajectory. The term $G_D(L_e - L_P)$ is used as a filter to reduce vibration caused by noise.

When the movement path 420 of the navigation apparatus deviates from a target illumination intensity trajectory 430 as shown in FIG. 4, the difference $L_e$ has a positive value and the velocity $V_L$ is greater than the velocity $V_R$. Thus, the navigation apparatus rotates in such a way that it returns to the target illumination intensity trajectory 430.

Figure 5:
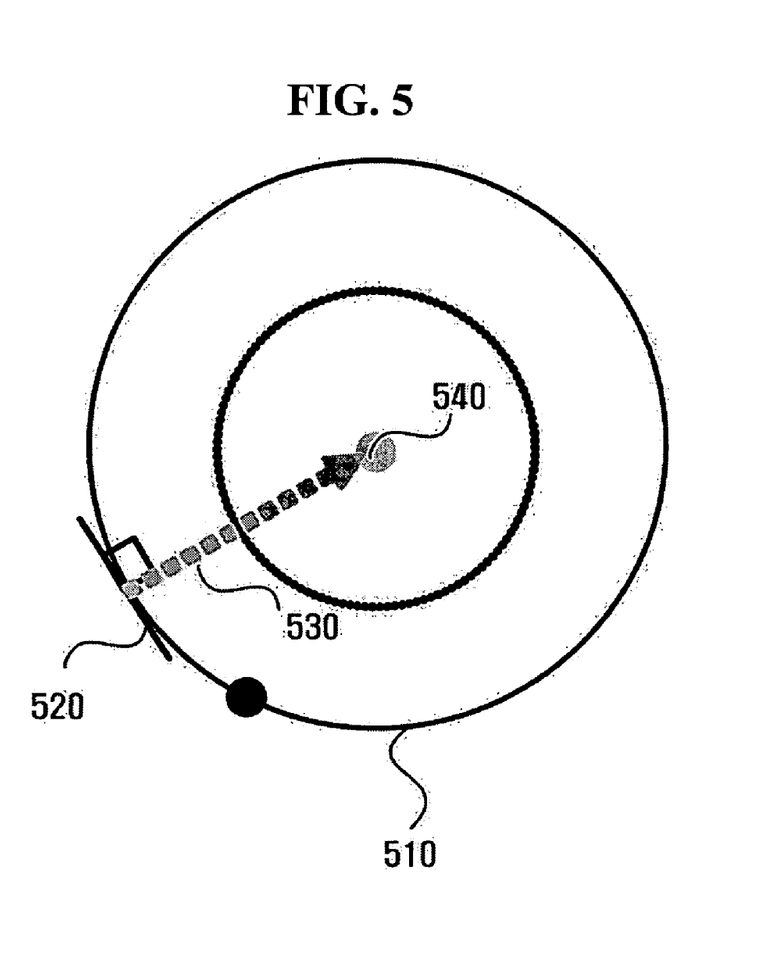
FIG. 5 shows the principle of moving a navigation apparatus to a center according to an embodiment of the present invention.

FIG. 5 shows the principle of moving a navigation apparatus to a center according to an embodiment of the present invention.

When a navigation apparatus is turned on or encounters an obstacle while moving along a target illumination intensity trajectory, the navigation apparatus switch into a center movement mode so that it moves to a position immediately below the source of light. The operation principle of the navigation apparatus in a center movement mode will now be described with reference to FIG. 5. When a cumulative distance 520 is greater than a predetermined threshold while the navigation apparatus is following a trajectory 510 where the current illumination intensity is equal to the target illumination intensity, the navigation apparatus rotates inward from the target illumination intensity trajectory 510, i.e., it rotates to be perpendicular to a tangential line of the target illumination intensity trajectory 510. In this case, the navigation apparatus moves along the target illumination intensity trajectory 510 a cumulative distance 520 in order to reduce an error that may occur when it rotates by 90 degrees toward the center. After rotating 90 degrees inward from the target illumination intensity trajectory 510, the navigation apparatus moves straight and continuously measures the intensity of illumination. The navigation apparatus ceases to operate at a position where the current illumination intensity is less than previously measured illumination intensity, or it moves in the reverse direction by a distance corresponding to time elapsed for the illumination intensity measurement before ceasing to operate since it has already moved past the position 540 immediately below the source of light.

Figure 6:
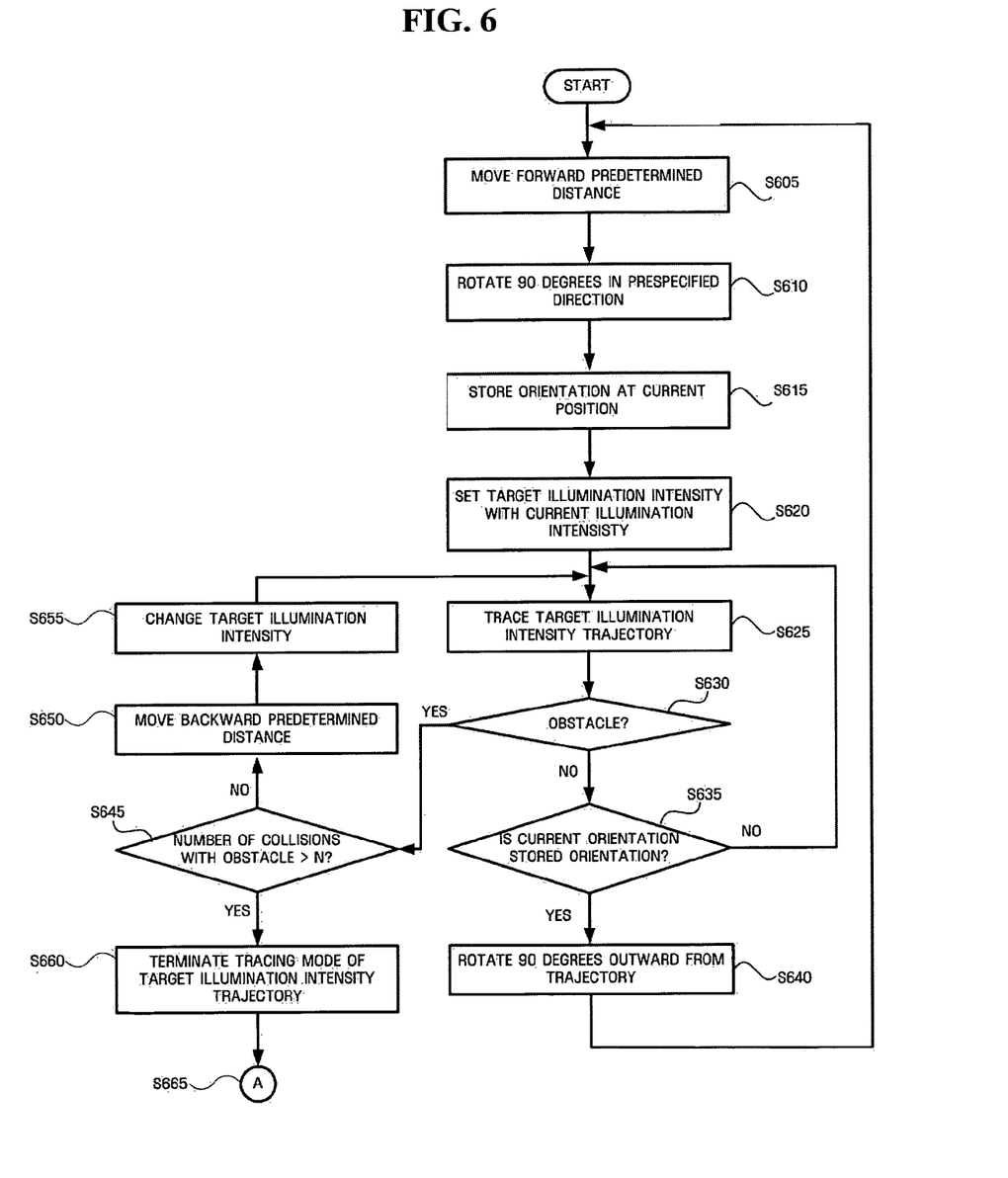
FIG. 6 is a flowchart illustrating a method of moving a navigation apparatus along a target illumination intensity trajectory according to an embodiment of the present invention.

FIG. 6 is a flowchart illustrating a method of moving a navigation apparatus along a target illumination intensity trajectory according to an embodiment of the present invention.

Referring to FIG. 6, the navigation apparatus moves forward by a predetermined distance in operation S605 and rotates 90 degrees in a pre-specified direction in operation S610. The predetermined distance may be the width of the navigation apparatus. For example, a disk-shaped cleaning robot may move forward a distance corresponding to its diameter or by the width of its dust absorber so that it can move across the entire interior space. The navigation apparatus may rotate either left or right.

In operation S615, the orientation of the navigation apparatus at a current position is stored, and in operation S620, illumination intensity is measured at the current position and designated as the target illumination intensity. In operation S625, the navigation apparatus moves along a trajectory of designated target illumination intensity until it returns to a trajectory start position. In operation S630, the presence of an obstacle is determined. When no obstacle is present, the process proceeds to operation S635. When the orientation of the navigation apparatus at the current position is the same as the stored orientation in operation S635, which means that it has returned to the trajectory start position after moving along the entire target illumination intensity trajectory, the navigation apparatus rotates 90 degrees outward from the trajectory in operation S640. After moving forward by a predetermined distance in the operation S605, operations S610 through S635 are repeated for a new target illumination intensity trajectory. Rotating 90 degrees outward from the target illumination intensity trajectory is based on the assumption that the navigation apparatus navigates along a concentric circle that starts from a position immediately below a source of light and extends outward from the start position, i.e., in the direction of decreasing illumination intensity. The navigation apparatus moves along the designated target illumination intensity trajectory based upon the principle described with reference to FIG. 4.

When an obstacle is detected while following the target illumination intensity trajectory in operation S630, the process proceeds to operation 645 where it is determined whether the number of collisions with the obstacle is greater than a threshold number N. When the number is not greater than the threshold number N, the navigation apparatus moves backward a predetermined distance in operation S650, changes the target illumination intensity in operation S655, and moves along a new trajectory in operation S625. When the number of collisions with the obstacle exceeds a threshold in operation S645, the navigation apparatus switches from a tracking mode S660, in which it moves along the target illumination intensity trajectory, to a center movement mode. In this case, since the navigation apparatus is located in an isolated space, the apparatus terminates the tracking mode and moves to a center before it turn its power off.

Figure 7:
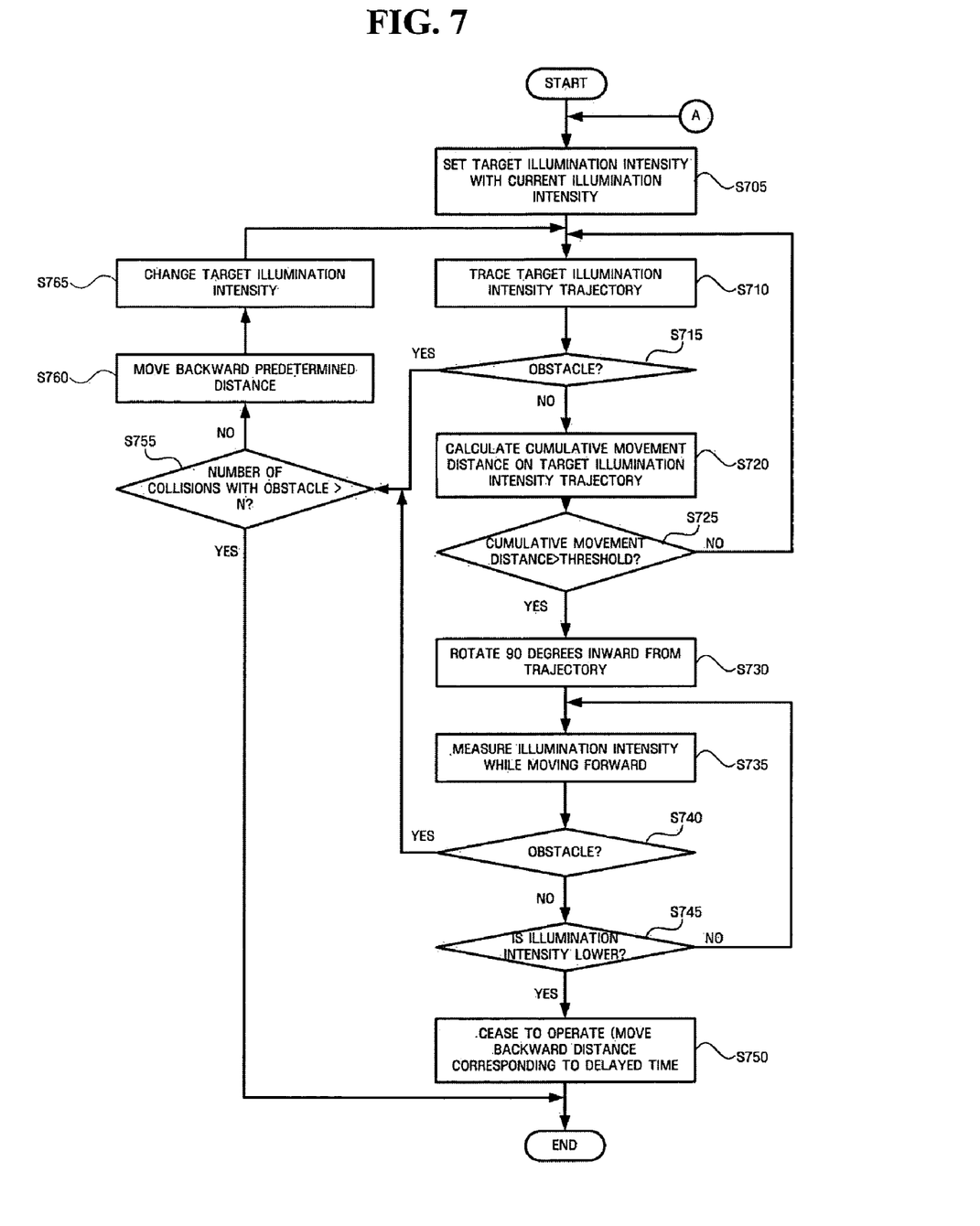
FIG. 7 is a flowchart illustrating a method of moving a navigation apparatus to a center according to an embodiment of the present invention.

FIG. 7 is a flowchart illustrating a method of moving a navigation apparatus to a center according to an embodiment of the present invention.

Referring to FIG. 7, in operation S705, illumination intensity is measured at a current position and this is designated as the target illumination intensity. In operation S710, the navigation apparatus follows the trajectory with the target illumination intensity. In operation S715, the presence of an obstacle is determined. When no obstacle is present, the process proceeds to operation S720. When an obstacle is present, the process continues to operation S755. The navigation apparatus calculates the cumulative distance traveled on the target illumination intensity trajectory in operation S720 and continues to follow the target illumination intensity trajectory in operation S710 until the traveled distance reaches a predetermined threshold in operation S725. When the cumulative distance traveled exceeds the threshold in the operation S725, the navigation apparatus moves forward, that is, in the direction of increasing illumination intensity by rotating inward to be perpendicular to a tangential line of the target illumination intensity trajectory S730. In operation S735, the navigation apparatus continues to move forward and measure illumination intensity. In operation S740, the presence of an obstacle is determined. When no obstacle is present, the process proceeds to operation S745. When the current illumination intensity is lower than the previously measured illumination intensity in operation S745, the navigation apparatus ceases to operate or moves backward by a distance corresponding to time elapsed for the illumination intensity measurement before ceasing to operate in operation S750.

When an obstacle is detected while following the target illumination intensity trajectory in operation S740, the process proceeds to operation S755 where it is determined whether the number of collisions with the obstacle is greater than a threshold number N. When the number is not greater than N, the apparatus moves backward a predetermined distance in operation S760, changes the target illumination intensity in operation S765, and moves along a new target illumination intensity trajectory in operation S710. When the number of collisions with the obstacle exceeds the threshold N in operation S755, the navigation apparatus terminates a center movement mode before it turns its power off.

Figure 8:
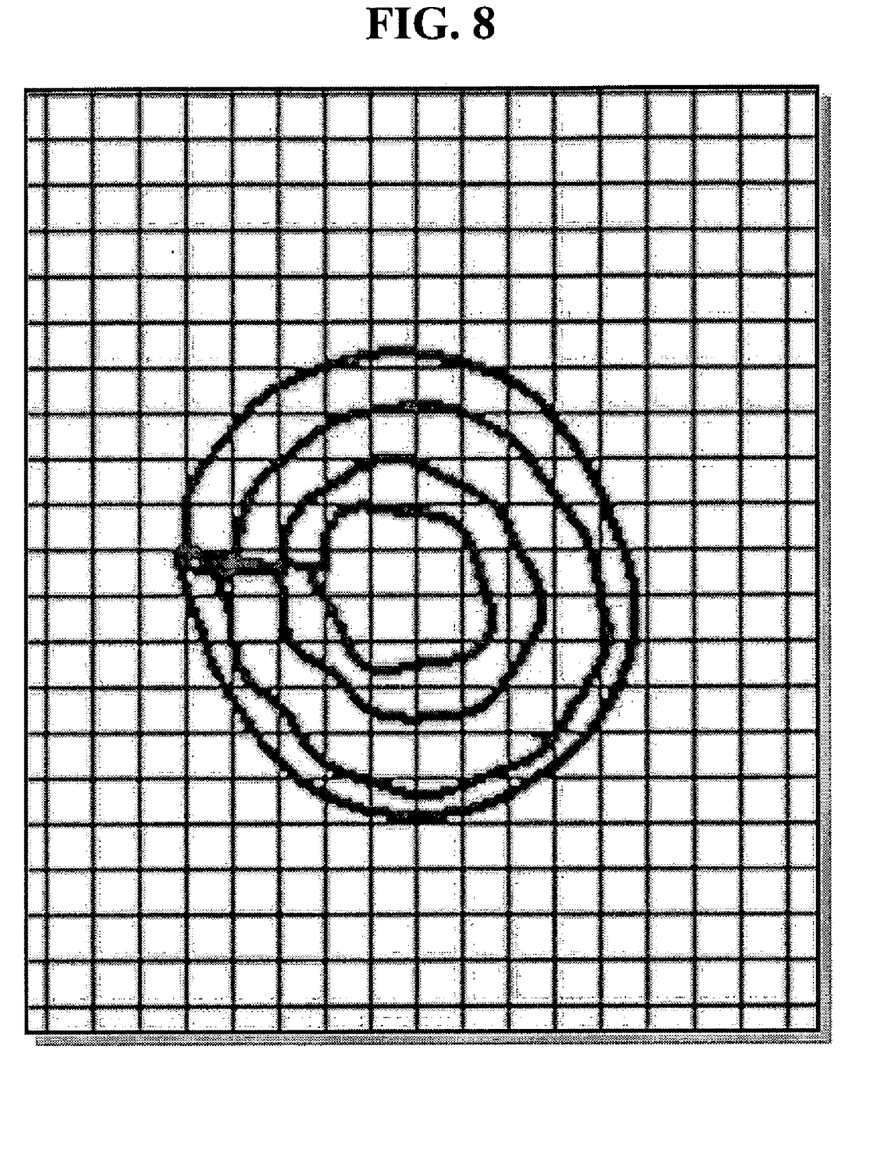
FIG. 8 shows the result of a driving simulation for a navigation apparatus according to an embodiment of the present invention.

FIG. 8 shows the result of driving simulation for a navigation apparatus according to an embodiment of the present invention.

The simulation is performed for a navigation apparatus that has one photosensitive sensor disposed at the upper front portion and two wheels and moves along a trajectory in a room with four fluorescent lamps installed at the center. After being turned on and moving to the center of the living room in a center movement mode, the navigation apparatus changes target illumination intensity four times to move along a new target illumination intensity trajectory. Thus, as is evident from FIG. 8, the navigation apparatus navigates along concentric circles centered on the center of the living room immediately below the fluorescent lamps.

The navigation apparatus and method of the present invention provide at least the following advantages.

First, the apparatus and method can reduce the manufacturing costs by using an inexpensive, simple photosensitive sensor.

Second, simple signal processing is facilitated by using a noise-free signal source.

Although a few embodiments of the present invention have been illustrated and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An apparatus for navigation based on illumination intensity, which includes an actuator and a drive unit actuated by the actuator, the apparatus comprising:
   a photosensitive sensor to sense light;
   a photosensitive sensor processor to calculate an illumination intensity of the light sensed by the photosensitive sensor;
   a drive unit to move the apparatus; an actuator to actuate the drive unit; and
   a task manager to generate data usable to move the apparatus along a trajectory of a target illumination intensity, where a measured illumination intensity calculated by the photosensitive sensor processor is the same as a preset target illumination intensity, using the difference between the measured illumination intensity and the preset target illumination intensity,
   wherein the actuator uses the data generated by the task manager to actuate the drive unit, and
   wherein the task manager generates data usable to move the apparatus to a location where the illumination intensity is the highest when the number of collisions with an obstacle on the movement path exceeds a predetermined threshold.

2. The apparatus of claim 1, wherein the data is used to move the apparatus along the target illumination intensity trajectory in such a way as to minimize a difference between the measured illumination intensity and the target illumination intensity.

3. The apparatus of claim 1, further comprising an obstacle detector to detect whether there is an obstacle in a movement path and providing information about the existence of obstacle to the task manager.

4. The apparatus of claim 1, further comprising a power supply to provide information about the amount of power remaining in a battery of the task manager.

5. The apparatus of claim 1, wherein the task manager generates data usable to move the apparatus to a location for charging when the amount of power remaining in the battery is less than a predetermined threshold.

6. The apparatus of claim 1, wherein the task manager generates data usable to move the apparatus to a location where the illumination intensity is the highest when the power is turned on.

7. The apparatus of claim 1, wherein the light is interior illumination.

8. The apparatus of claim 1, wherein the data generated by the task manager contains the linear velocity of the drive unit.

9. The apparatus of claim 1, wherein the data generated by the task manager contains the rotary angle of the drive unit with respect to the movement path.

10. The apparatus of claim 1, wherein the photosensitive sensor comprises a photodiode.

11. A method of navigating a navigation apparatus including an actuator and a drive unit and actuated by the actuator based on an illumination intensity, the method comprising:
   designating an initial measured illumination intensity as a target illumination intensity by using a photosensitive sensor;
   generating data usable to move the navigation apparatus along a target illumination intensity trajectory, where the measured illumination intensity is the same as a preset target illumination intensity, using the difference between the measured illumination intensity and the preset target illumination intensity, wherein the usable data is usable to move the apparatus to a location where the illumination intensity is highest when the number of collisions with an obstacle movement path exceeds a predetermined threshold;

actuating the drive unit using the data to move the navigation apparatus along the target illumination intensity trajectory; and storing a start position before designating the initial measured illumination intensity as the target illumination intensity.

12. The method of claim 11, wherein the data is used to move the apparatus along the target illumination intensity trajectory in such a way as to minimize a difference between the measured illumination intensity and the target illumination intensity.

13. The method of claim 11, wherein the start position is represented by an orientation of a position.

14. The method of claim 11, further comprising:
moving to a position where the illumination intensity is the highest after moving along the target illumination intensity trajectory.

15. The method of claim 14, wherein the moving to the position where the illumination intensity is the highest comprises:
calculating a cumulative movement distance on the target illumination intensity trajectory;
rotating 90 degrees inward from the target illumination intensity trajectory when the cumulative movement distance is greater than a predetermined threshold;
measuring illumination intensity while moving forward after the rotation; and
ceasing to operate when the measured illumination intensity is less than the previously measured illumination intensity.

16. The method of claim 15, further comprising:
moving backward a predetermined distance when there is an obstacle in the movement path after the measuring of the illumination intensity while moving; and
changing the target illumination intensity after the moving backward.

17. The method of claim 16, wherein the moving backward the predetermined distance and the changing of the target illumination intensity are performed when a number of collisions with the obstacle is less than a predetermined threshold.

18. The method of claim 11, wherein the data usable to move the navigation apparatus along the target illumination intensity trajectory is generated using a difference between illumination intensity measured on a current movement path and the target illumination intensity.

19. The method of claim 18, wherein the data contains the linear velocity of the drive unit.

20. The method of claim 18, wherein the data contains the rotary angle of the drive unit.

21. The method of claim 11, further comprising:
calculating a cumulative distance traveled on the target illumination intensity trajectory;
rotating the navigation apparatus inward 90 degrees relative to a tangent of the target illumination intensity trajectory when the cumulative distance traveled is greater than a predetermined threshold;
measuring the illumination intensity while moving the navigation apparatus forward after the rotation; and
ceasing operation of the navigation apparatus when the measured illumination intensity is less than the previously measured illumination intensity.

22. The method of claim 21, further comprising:
moving the navigation apparatus backward a predetermined distance when there is an obstacle in the movement path after the measuring of the illumination intensity while moving; and
changing the target illumination intensity after the moving backward.

23. The method of claim 22, wherein the moving backward a predetermined distance and the changing of the target illumination intensity are performed when a number of collisions with the obstacle is less than a predetermined threshold.

24. The apparatus of claim 11, wherein the photosensitive sensor comprises a photodiode.

25. A method of navigating a navigation apparatus including an actuator and a drive unit and actuated by the actuator based on an illumination intensity, the method comprising:
designating an initial measured illumination intensity as a target illumination intensity by using a photosensitive sensor;
generating data usable to move the navigation apparatus along a target illumination intensity trajectory where the measured illumination intensity is the same as the target illumination intensity;
actuating the drive unit using the data to move the navigation apparatus along the target illumination intensity trajectory; and
storing a start position before designating the initial measured illumination intensity as the target illumination intensity,
wherein the start position is obtained after the navigation apparatus moves forward by a predetermined distance and then rotates 90 degrees in a pre-specified direction.

26. A method of navigating a navigation apparatus including an actuator and a drive unit and actuated by the actuator based on an illumination intensity, the method comprising:
designating an initial measured illumination intensity as a target illumination intensity by using a photosensitive sensor;
generating data usable to move the navigation apparatus along a target illumination intensity trajectory where the measured illumination intensity is the same as the target illumination intensity;
actuating the drive unit using the data to move the navigation apparatus along the target illumination intensity trajectory;
storing a start position before designating the initial measured illumination intensity as the target illumination intensity; and
moving to another start position and repeating the process of designating the target illumination intensity when the navigation apparatus returns to the start position on the target illumination intensity trajectory after moving along the trajectory.

27. The method of claim 26, wherein the another start position is obtained after the navigation apparatus rotates 90 degrees outward from the target illumination intensity trajectory, moves forward by a predetermined distance, and rotates 90 degrees in a pre-specified direction.

28. A method of navigating a navigation apparatus including an actuator and a drive unit and actuated by the actuator based on an illumination intensity, the method comprising:
designating an initial measured illumination intensity as a target illumination intensity by using a photosensitive sensor;

generating data usable to move the navigation apparatus along a target illumination intensity trajectory where the measured illumination intensity is the same as the target illumination intensity;

actuating the drive unit using the data to move the navigation apparatus along the target illumination intensity trajectory;

storing a start position before designating the initial measured illumination intensity as the target illumination intensity; and moving backward a predetermined distance and changing the target illumination intensity when the navigation apparatus encounters an obstacle in its movement path after moving along the target illumination intensity trajectory.

29. The method of claim 28, wherein the moving backward the predetermined distance and the changing of the target illumination intensity are performed when a number of collisions with the obstacle is less than a predetermined threshold.

30. A computer-readable storage medium encoded with processing instructions for causing a processor to execute a method for navigating a navigation apparatus including an actuator and a drive unit and actuated by the actuator based on an illumination intensity, the method comprising:

designating an initial measured illumination intensity as a target illumination intensity by using a photosensitive sensor;

generating data usable to move the navigation apparatus along a target illumination intensity trajectory, where the measured illumination intensity is the same as a preset target illumination intensity, using the difference between the measured illumination intensity and the preset target illumination intensity, wherein the usable data is usable to move the apparatus to a location where the illumination intensity is highest when the number of collisions with an obstacle movement path exceeds a predetermined threshold;

actuating the drive unit using the data to move the navigation apparatus along the target illumination intensity trajectory; and storing a start position before designating the initial measured illumination intensity as the target illumination intensity.

31. The computer-readable storage medium of claim 30, the method further comprising:

calculating a cumulative distance traveled on the target illumination intensity trajectory;

rotating the navigation apparatus inward 90 degrees relative to tangent of the target illumination intensity trajectory when the cumulative distance traveled is greater than a predetermined threshold;

measuring the illumination intensity while moving the navigation apparatus forward after the rotation; and ceasing operation of the navigation apparatus when the measured illumination intensity is less than the previously measured illumination intensity.

* * * * *

UNITED STATES PATENT AND TRADEMARK OFFICE
CERTIFICATE OF CORRECTION

PATENT NO.        : 7,996,126 B2                                   Page 1 of 1
APPLICATION NO.   : 11/237711
DATED             : August 9, 2011
INVENTOR(S)       : Young-jin Hong It is certified that error appears in the above-identified patent and that said Letters Patent is hereby corrected as shown below:

Column 8, Line 5-27, Delete "1. An apparatus for navigation based on illumination intensity, which includes an actuator and a drive unit actuated by the actuator, the apparatus comprising:
a photosensitive sensor to sense light;
a photosensitive sensor processor to calculate an illumination intensity of the light sensed by the photosensitive sensor;
a drive unit to move the apparatus; an actuator to actuate the drive unit; and
a task manager to generate data usable to move the apparatus along a trajectory of a target illumination intensity, where a measured illumination intensity calculated by the photosensitive sensor processor is the same as a preset target illumination intensity, using the difference between the measured illumination intensity and the preset target illumination intensity,
wherein the actuator uses the data generated by the task manager to actuate the drive unit, and
wherein the task manager generates data usable to move the apparatus to a location where the illumination intensity is the highest when the number of collisions with an obstacle on the movement path exceeds a predetermined threshold." and
insert -- 1. An apparatus for navigation based on illumination intensity, which includes an actuator and a drive unit actuated by the actuator, the apparatus comprising:
a photosensitive sensor to sense light;
a photosensitive sensor processor to calculate an illumination intensity of the light sensed by the photosensitive sensor;
a drive unit to move the apparatus;
an actuator to actuate the drive unit; and
a task manager to generate data usable to move the apparatus along a trajectory of a target illumination intensity, where a measured illumination intensity calculated by the photosensitive sensor processor is the same as a preset target illumination intensity, using the difference between the measured illumination intensity and the preset target illumination intensity,
wherein the actuator uses the data generated by the task manager to actuate the drive unit, and
wherein the task manager generates data usable to move the apparatus to a location where the illumination intensity is the highest when the number of collisions with an obstacle on the movement path exceeds a predetermined threshold. --, therefor.

Signed and Sealed this
Twenty-eighth Day of February, 2012

David J. Kappos
*Director of the United States Patent and Trademark Office*